(12) United States Patent
Yanokuchi et al.

(10) Patent No.: US 7,959,870 B2
(45) Date of Patent: Jun. 14, 2011

(54) SEPARATOR AND UNLOADING DEVICE

(75) Inventors: Tomokazu Yanokuchi, Tokyo (JP);
Keiichi Yamaguchi, Tokyo (JP);
Masayuki Kidokoro, Tokyo (JP);
Katsuhiko Kawakami, Tokyo (JP)

(73) Assignee: Softard Industries Co., Ltd., Tokyo (JP)

( * ) Notice: Subject to any disclaimer, the term of this patent is extended or adjusted under 35 U.S.C. 154(b) by 271 days.

(21) Appl. No.: 12/391,701

(22) Filed: Feb. 24, 2009

(65) Prior Publication Data
US 2009/0214403 A1 Aug. 27, 2009

(30) Foreign Application Priority Data

Feb. 25, 2008 (JP) ................. 2008-042783

(51) Int. Cl.
*B01J 8/08* (2006.01)
(52) U.S. Cl. .......... 422/219; 422/187; 429/479; 29/284; 29/592.1
(58) Field of Classification Search .......... 422/219, 422/187; 429/479; 29/284, 592.1
See application file for complete search history.

(56) References Cited

U.S. PATENT DOCUMENTS

| | | | | |
|---|---|---|---|---|
| 3,384,420 A * | 5/1968 | Fiscus | ............. | 406/173 |
| 3,662,886 A * | 5/1972 | Kennedy, Jr. | ............. | 209/250 |
| 4,278,240 A * | 7/1981 | Archenholtz | ............. | 266/216 |
| 4,312,388 A * | 1/1982 | Hager et al. | ............. | 141/1 |
| 4,568,029 A * | 2/1986 | Newton et al. | ............. | 241/19 |
| 5,114,685 A * | 5/1992 | Sapoff | ............. | 422/219 |
| 5,228,484 A * | 7/1993 | Johnson | ............. | 141/65 |
| 6,182,716 B1* | 2/2001 | Fry | ............. | 141/67 |
| 6,273,102 B1* | 8/2001 | Kawakami et al. | ............. | 134/22.1 |
| 7,434,601 B2* | 10/2008 | Kraus et al. | ............. | 141/85 |
| 2002/0104580 A1* | 8/2002 | Fry | ............. | 141/67 |
| 2004/0134518 A1* | 7/2004 | Kraus et al. | ............. | 134/18 |
| 2005/0214177 A1* | 9/2005 | Albin | ............. | 422/145 |
| 2007/0267090 A1* | 11/2007 | Jordan et al. | ............. | 141/65 |

FOREIGN PATENT DOCUMENTS

JP 11-262651 9/1999

OTHER PUBLICATIONS

Machine Translation of JP-11262651A—Dec. 21, 2010.*

* cited by examiner

*Primary Examiner* — Walter D Griffin
*Assistant Examiner* — Huy-Tram Nguyen
(74) *Attorney, Agent, or Firm* — Rankin, Hill & Clark LLP

(57) ABSTRACT

An unloading device includes: a separator connected to a suction hose connected to the reactor and to another suction hose connected to a vacuum car, the separator separating a catalyst sucked from the reactor by the vacuum car from air; a flexible container bag for storing the catalyst dropped from the separator; and a dumping hose provided between the separator and the flexible container bag for transferring the catalyst dropped from the separator to the flexible container bag. The separator includes a blower unit for blowing a gas to the catalyst unloaded in the separator body toward a lower cone and a cover that openably closes a catalyst outlet.

6 Claims, 2 Drawing Sheets though the amount of the blown gas is controlled by the gas amount regulator, the blowing amount of the gas can be regulated in accordance with the weight of the catalyst or the suction force of the vacuum unit.

SEPARATOR AND UNLOADING DEVICE

BACKGROUND OF THE INVENTION

1. Field of the Invention

The present invention relates to a separator for separating a catalyst used in a reactor of petroleum refinery plant, chemical plant and the like from air, and an unloading device provided with the separator.

2. Description of the Invention

Traditionally, a catalyst used in a reactor of petroleum refinery plant, chemical plant and the like has to be unloaded from the reactor after being used in a chemical reaction. Use of vacuum unit is known for sucking the used catalyst.

A catalyst-unloading separator situated between the vacuum unit and a reactor to separate the catalyst sucked by the vacuum unit from air is also known (see, for instance, Document 1: JP-A-11-262651).

In Document 1, the catalyst is unloaded by a vacuum car (vacuum unit) for sucking the catalyst and a suction hose connected with the vacuum car and provided with an end inserted into the reactor. The catalyst-unloading separator includes a tank body for storing the catalyst sucked from the reactor and a cover provided on the tank body in an openable/closable manner.

In Document 1, however, since the catalyst is ejected into the separator at a high speed, the catalyst is likely to collide with a wall to be damaged.

SUMMARY OF THE INVENTION

An object of the invention is to provide a separator that is capable of separating a catalyst from air while restraining damage on the catalyst, and an unloading device provided with the separator.

A separator according to an aspect of the invention is in communication with a reactor loaded with a catalyst through a first connection hose and in communication with a vacuum unit through a second connection hose, the separator separating the catalyst sucked by the vacuum unit from the reactor from air, the separator including: a separator body that stores the catalyst; and a blower unit provided to the separator body for blowing a gas toward a bottom of the separator body to the catalyst sucked by the vacuum unit through the first connection hose.

Since the gas is blown to the catalyst sucked into the separator body through the first connection hose by the blower unit, the catalyst against an inner wall of the separator body can be mitigated and damage on the catalyst can be restrained to the minimum, so that more amount of undamaged catalyst can be unloaded.

In the above aspect of the invention, the blower unit preferably include: a blower for blowing the gas, the blower being provided above of the first connection hose opened to an inside of the separator body; and a gas amount regulator that regulates an amount of the gas blown by the blower.

With the above arrangement, since the amount of the blown gas is controlled by the gas amount regulator, the blowing amount of the gas can be regulated in accordance with the weight of the catalyst or the suction force of the vacuum unit.

In the above arrangement, the blower is preferably tapered to be wider toward the bottom of the separator body.

With the above arrangement, the gas ejected by the blower can be easily blown to the catalyst sucked into the separator body.

In the above aspect of the invention, an inlet tube having an end connected to the first connection hose and another end opened approximately at a center of the separator body is preferably provided.

With the above arrangement, the catalyst sucked through the inlet tube is not hit hard against the inner wall of the separator body.

In the above aspect of the invention, the gas is preferably air.

Since air outside the separator body can be used as the gas blown by the blower unit, the arrangement of the separator can be simplified and less cost is required as compared with an arrangement using nitrogen-gas and the like.

An unloading device according to another aspect of the invention includes: the separator according to the above aspect; and a container provided below the separator, the container having a storage hole through which the catalyst is to be stored, in which the separator includes: a catalyst outlet provided near the bottom of the separator body relative to a communication hole of the first connection hose opened to an inside of the separator body and a connector hole of the second connection hose opened to the inside of the separator body, the catalyst outlet allowing a passage of the catalyst; and a cover that openably closes the catalyst outlet, and the container is provided below the cover to store the catalyst passing through the catalyst outlet when the cover is opened.

According to the above aspect of the invention, since the unloading device closes the catalyst outlet by the cover, a predetermined amount of the catalyst is accumulated in the separator body. When the cover is opened after the predetermined amount of the catalyst is accumulated in the separator body, the catalyst passes through the catalyst outlet to be stored in the container.

By repeating the open/close operation of the cover, the unloading device can continuously drop the catalyst accumulated in the separator body into the container.

In the unloading device according to the above aspect of the invention, it is preferable that a dumping hose substantially longitudinally extending along a vertical direction is provided between the separator and the container, an upper end of the dumping hose is located below the catalyst outlet and has a top opening larger than the catalyst outlet, and a lower end of the dumping hose is located above the storage hole and has a bottom opening smaller than the catalyst outlet.

With the above arrangement, the catalyst stored in the separator body passes through the catalyst outlet, the opening on the upper end of the dumping hose close to the separator, the opening on the lower end of the dumping hose close to the container and the storage hole before being stored in the container, so that the catalyst is not scattered to the outside when the catalyst is dropped. Further, the separator can be located at a high position. For instance, the separator can be provided adjacent to an opening provided on a top stage of the reactor, i.e. a reactor manhole.

DETAILED DESCRIPTION OF PREFERRED EMBODIMENT(S)

Figure 1:
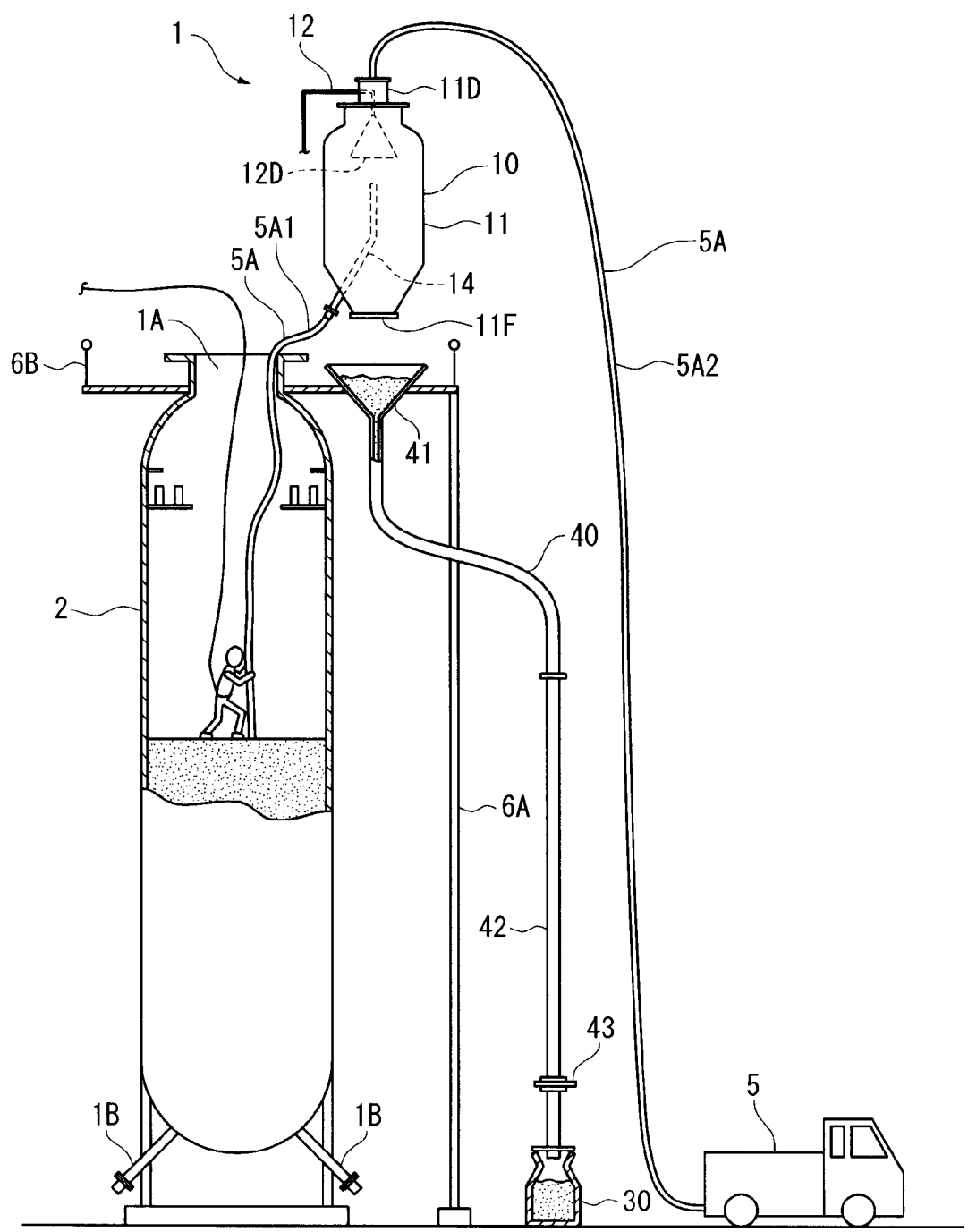
FIG. 1 is a diagram showing an entire arrangement of a catalyst-unloading device according to an embodiment of the invention.
Figure 2:
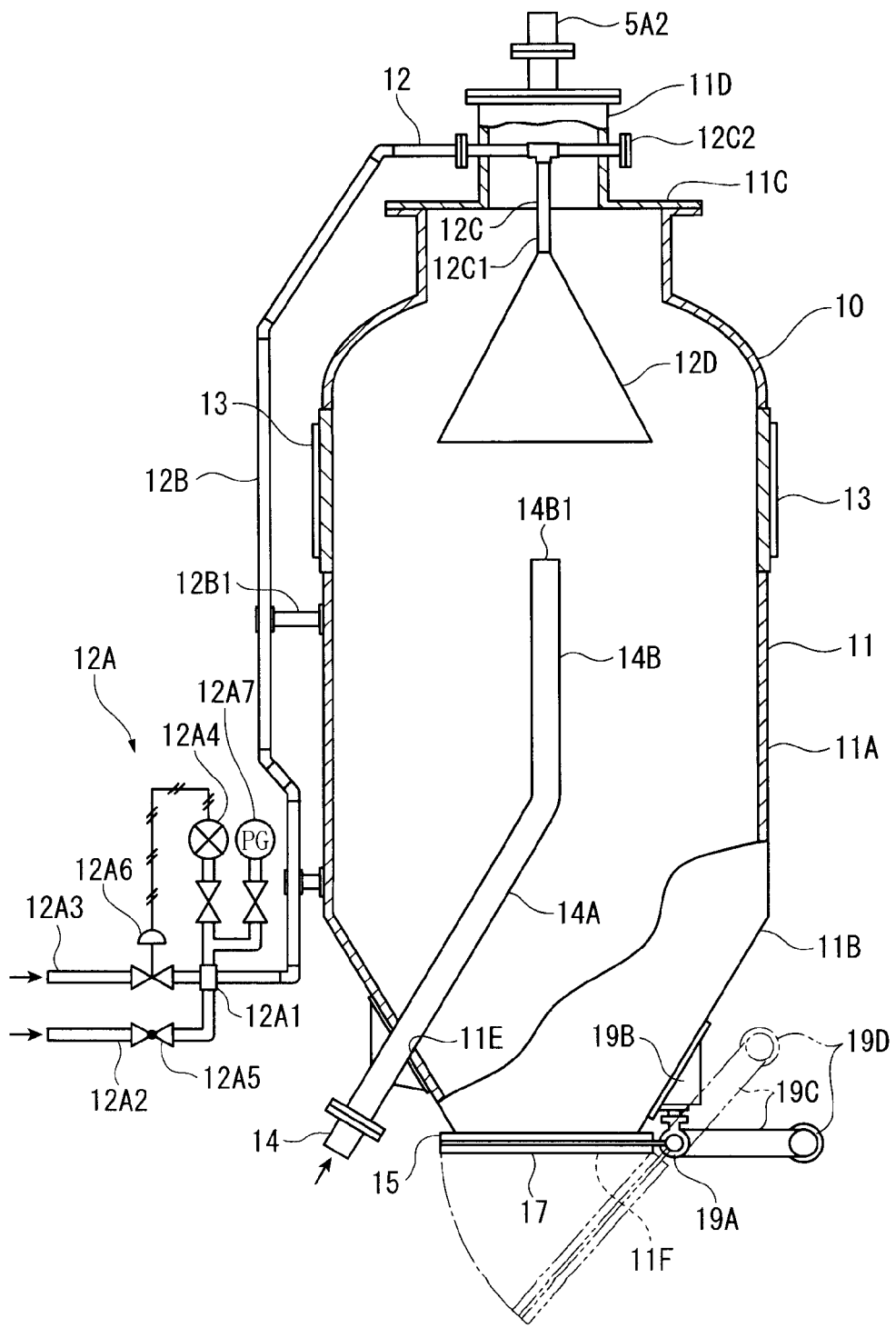
FIG. 2 is a partial cross section showing a separator according to the embodiment used for unloading the catalyst within the reactor.

An embodiment of the invention will be described below with reference to the drawings. A separator 10 of this embodiment separates a catalyst sucked from a reactor 2 while restraining damages thereon. FIG. 1 shows an entire arrangement of an unloading device 1 including the separator 10 of the invention. FIG. 2 is a partial cross section showing a separator body 11 of the unloading device 1 according to the embodiment used for unloading the catalyst within the reactor 2.

As shown in FIG. 1, the unloading device 1 of this embodiment includes: the separator 10 disposed near a reactor manhole 1A provided on a top of the reactor 2; a flexible container bag 30 (container) disposed on the ground for storing the catalyst dropped from the separator 10; and a dumping hose 40 provided between the separator 10 and the flexible container bag 30. The container may alternatively be a drum, flow bottle, steel container and the like instead of a flexible container bag.

A vacuum car 5 (vacuum unit) is placed near the separator 10, so that the catalyst inside the reactor 2 can be sucked by a vacuum hose 5A of which an end is inserted into the reactor 2 through the manhole 1A. The vacuum hose 5A includes a first suction hose 5A1 (first connection hose) extending from the inside of the reactor 2 to the separator 10 and a second suction hose 5A2 extending from the separator body 11 to the vacuum car 5.

The manhole 1A is provided on a top stage of the reactor 2. Catalyst dumping nozzles 1B are provided on a bottom of the reactor 2. A column 6A extending along a side of the reactor 2 is provided on the ground around the reactor 2. A handrail 6B is supported by the column 6A to allow an operator to work on the reactor 2 or the separator 10. As described below, a hopper 41 connected to an end of the dumping hose 40 is fixed to the handrail 6B.

The separator 10 of the embodiment separates the catalyst sucked through the suction hose 5A1 by the vacuum car 5 from air and discharges the catalyst to the hopper 41 while restraining damages of the catalyst to the minimum.

The separator 10 is attached to, for instance, a frame platform (not shown) provided on the handrail 6B. The dumping hose 40 disposed below the separator 10 has an upper end located close to the separator 10 and a lower end inserted into the inside of the flexible container bag 30. The upper end of the dumping hose 40 close to the separator 10 is provided with a tapered hopper 41 having an opening opposed to a catalyst outlet 11F for temporarily storing the catalyst taken out of the separator 10. The diameter of the opening of the hopper 41 is widened toward the separator 10. The lower end of the dumping hose 40 near the flexible container bag 30 is provided by a down-flow pipe 42 having an axis extending substantially vertically. A stopper 43 is provided on the bottom of the down-flow pipe 42. The stopper is opened and closed so that the catalyst is temporarily stored within the down-flow pipe 42. The inner diameter of the dumping hose 40 is not restricted as long as the catalyst can be transferred.

As shown in FIG. 2 in detail, the separator 10 includes the separator body 11. The separator body 11 has an upper cylinder 11A with a predetermined outer diameter including an upper lid 11C, and a lower cone 11B that is tapered downward. A blower unit 12 for blowing air to the bottom side penetrates the upper lid 11C. A connector 11D projecting vertically upward is provided approximately at the center of the upper lid 11C. The connector 11D has a connector hole to be connected with the suction hose 5A2.

The blower unit 12 includes: an air regulator 12A for regulating the blown air; a pipe 12B connected to the air regulator 12A; a T-shaped first pipe connector 12C connected to the pipe 12B; and a nozzle 12D (blower) connected to the first pipe connector 12C.

The air regulator 12A includes a '+'-shaped second pipe connector 12A1 connected to the pipe 12B. The second pipe connector 12A1 includes a manual adjustor 12A2 and an auto-adjustor 12A3 for adjusting the amount of the air flowed toward the separator body 11. The manual adjustor 12A2 is capable of adjusting the amount of the air flowed toward the separator body 11 by manually opening and closing a valve 12A5. When the valve 12A5 is opened, the air is flowed from the manual adjustor 12A2 toward the separator body 11 through the second pipe connector 12A1. Accordingly, the collision of the catalyst against the inner wall of the separator body 11 is mitigated, thus restraining the damages on the catalyst.

The auto-adjustor 12A3 includes a regulator valve 12A6 that is automatically opened and closed. Specifically, the auto-adjustor 12A3 is connected to the detector unit 12A4 for detecting the amount of the air flowed toward the separator body 11. The regulator valve 12A6 is opened and closed in accordance with the amount of the air detected by the detector 12A4 to regulate the amount of the air flowed into the separator body 11. A pressure gauge 12A7 indicating a pressure of the air flowed toward the separator body 11 is connected to the detector 12A4.

The pipe 12B is bent substantially along the side of the upper lid 11C and the separator body 11. The pipe 12B is fixed on an outer wall of the separator body 11 by a fixture 12B1. A vertically extending first end 12C1 of the first pipe connector 12C penetrates the upper lid 11C. A second end 12C2 of the first pipe connector 12C extends horizontally to be closed at an end thereof. The nozzle 12D is connected to the first end 12C1 of the first pipe connector 12C and is opposed to an end of a later-described vertical section 14B. The nozzle 12D is tapered to be wider toward the lower cone 11B. Incidentally, the nozzle 12D may alternatively assume an upside-down cup-shape instead of the tapered shape.

An observation window 13 for allowing visual inspection of the inside of the separator body 11 is provided on a lateral portion of the upper cylinder 11A. A catalyst inlet 11E is provided on the bottom of the lower cone 11B. An inlet tube 14 connected to an end of the suction hose 5A1 extending from the reactor 2 is inserted into the separator body 11 through the catalyst inlet 11E. The inlet tube 14 includes a connector pipe 14A connected to the end of the suction hose 5A1 and the vertical section 14B continuous with the connector 14A to be vertically extended approximately to the center of the separator body 11 to oppose to the nozzle 12D. The inlet tube 14 is bent to show an approximately dogleg shape in the entirety thereof.

Accordingly, the catalyst within the reactor 2 is sucked into the separator body 11 from the vertical section 14B. Since the cross section of the inlet tube 14 is significantly smaller than the cross section of the separator body 11, the vacuum suction force inside the separator body 11 is lessened. Accordingly, the catalyst falls toward the lower cone 11B while air is solely sucked by the suction hose 5A2.

The inlet tube 14 may alternatively be inserted through the lateral portion of the upper cylinder 11A or through the upper lid 11C. The inlet tube 14 may be L-shaped and the like instead of the dogleg shape.

The catalyst outlet 11F through which the catalyst passes through is provided on the lower end of the lower cone 11B. A flange 15 is provided on the outer circumference of the lower end of the lower cone 11B. The cover 17 provided on the lower cone 11B of the separator body 11 is opened/closed to cover the lower side of the flange 15. The cover 17 is attached to a support shaft 19A. The support shaft 19A is rotatably supported by a bracket 19B downwardly attached to a lower cone 11B of the separator body 11.

The support shaft 19A is provided with an attachment plate 19C that extends opposite to the cover 17 with the support shaft 19A being interposed therebetween. An weight 19D is provided on an end of the attachment plate 19C remote from the support shaft 19A. The cover 17 and the attachment plate 19C are collinearly fixed so that the cover and the attachment plate 19C are automatically pivoted in mutually opposite directions around the support shaft 19A as a result of a rotation of the support shaft 19A. Further, in an ordinary use, more weight is applied on the side of the weight 19D around the support shaft 19A, so that the cover 17 is raised to close the catalyst outlet 11F.

Catalyst Unloading Operation

Next, unloading operation of the catalyst in the reactor 2 using the unloading device 1 will be described below. Initially, in advance to unloading the catalyst, an operator removes a reacted material such as heavy oil after suspending the operation of the reactor 2.

Then, the catalyst inside the reactor 2 is sucked by the vacuum suction hose 5A. The sucked catalyst is transferred from the suction hose 5A1 to the separator body 11 through the inlet tube 14.

At this time, since the catalyst is blown toward the lower cone 11B by the air ejected from the nozzle 12D, the catalyst is accumulated on the cover 17 of the lower cone 11B. On the other hand, air is sucked toward the vacuum car 5 through the suction hose 5A2.

At this time, when the weight of the catalyst overcomes the weight of the weight 19D, the cover 17 is opened to drop the catalyst to be transferred to the hopper 41 provided below the separator body 11.

After the catalyst is dropped, the cover 17 is raised by the weight of the weight 19D to close the catalyst outlet 11F of the separator body 11.

The catalyst stored in the hopper 41 free-falls from an opening on the lower end of the hopper 41 to be transferred to the down-flow pipe 42 through the dumping hose 40. At this time, the lower end of the down-flow pipe 42 is closed by the openable/closable stopper 43. When the stopper 43 is opened after a predetermined amount of the catalyst is accumulated in the down-flow pipe 42, the catalyst free-falls to be stored in the flexible container bag 30.

Advantages of Embodiment

According to the above embodiment, following advantages can be obtained.

The separator 10 includes the separator body 11 in connection with the reactor 2 through the suction hose 5A1 and with the vacuum car 5 through the suction hose 5A2. Further, the blowing unit 12 that opposes to the vertical section 14B of the inlet tube 14 connected to the suction hose 5A1 is provided on the upper side of the separator body 11.

Accordingly, air ejected by the blower unit 12 is blown to the catalyst introduced through the inlet tube 14, so that the collision of the catalyst against the inner wall of the separator body 11 is mitigated, thus restraining the damages on the catalyst.

Since the separator body 11 is disposed between the reactor 2 and the vacuum car 5 to allow an automatic and continuous discharge of the catalyst, the catalyst unloading operation from the reactor 2 can be facilitated.

Further, the openable/closable stopper 43 is provided on the lower end of the down-flow pipe 42.

When the stopper 43 closes the lower end of the down-flow pipe 42, the catalyst passing through the dumping hose 40 and the down-flow pipe 42 is met with resistance by the air inside the dumping hose 40 and the down-flow pipe 42 before being accumulated on the stopper 43. Accordingly, since the catalyst falls while being encountered by the resistance of the air, the damage on the catalyst caused by collision against the dumping hose 40 and the down-flow pipe 42 can be restrained.

Since the discharge amount of the catalyst can also be adjusted by the stopper 43, a predetermined amount of the catalyst can be stored in the flexible container bag 30.

Since the cross section of the inlet tube 14 is significantly smaller than the cross section of the separator body 11, the vacuum suction force inside the separator body 11 is lessened. Accordingly, the catalyst is more easily fallen by the weight thereof.

Thus, since air is solely sucked by the suction hose 5A2, the separator 10 can efficiently separate the catalyst from air in unloading the catalyst.

The dumping hose 40 is provided with the hopper 41 at the end close to the catalyst outlet 11F.

Since the catalyst discharged through the catalyst outlet 11F is temporarily stored, the inner diameter of the dumping hose 40 can be reduced. In other words, the inner diameter of the dumping hose 40 can be reduced by the amount of the catalyst stored by the hopper 41. Further, since the catalyst is temporarily held by the hopper 41, the damage on the catalyst can be restrained as compared with falling the catalyst directly from the separator body 11 to the dumping hose 40.

The blower unit 12 includes the air regulator 12A for regulating the amount of the ejected air.

Accordingly, the amount of the blown air can be regulated in accordance with the weight of the catalyst and suction force of the vacuum unit and the internal pressure of the separator body 11 can be prevented from being excessively lowered.

The blower unit 12 includes the nozzle 12D tapered to be wider toward the lower cone 11B.

Accordingly, air blown by the nozzle 12D is easily blown to the catalyst sucked into the separator body 11.

The end of the vertical section 14B is located approximately at the center of the separator body 11 to oppose to the nozzle 12D.

Accordingly, the catalyst flowed into the separator body 11 is easily evenly accumulated in the lower cone 11B.

The gas blown into the inside of the separator body 11 is air.

Since air can be used as the gas blown to the catalyst, the arrangement of the separator can be simplified and less cost is required as compared with an arrangement using nitrogen-gas and the like.

The cover 17 that openably closes the catalyst outlet 11F through which the catalyst passes is provided on the lower end of the lower cone 11B. The flexible container bag 30 is provided below the lid 17.

Accordingly, the cover 17 closes the catalyst outlet 11F as a result of the rotation of the support shaft 19A in an openable/closable manner around the support shaft 19A. After the catalyst is dropped by opening the cover 17, the cover 17 is automatically closed due to the weight of the weight 19D. The open/close operation of the cover 17 is repeated, so that the unloading device 1 can continuously drop the catalyst accumulated in the separator body 11 into the flexible container bag 30.

The dumping hose 40 is provided between the separator 10 and the flexible container bag 30.

Accordingly, since the separator 10 can be located close to the manhole 1A of the reactor 2, the length of the suction hose 5A1 can be reduced. Thus, when the catalyst flows in the suction hose 5A1, the collision of the catalyst against the inner surface of the suction hose 5A1 can be reduced, thus restraining the damage on the catalyst.

Modifications of Embodiment

Incidentally, the scope of the invention is not restricted to the above embodiments but includes the following modifications as long as an object of the invention can be achieved.

Though the second pipe connector 12A1 of the air regulator 12A includes the manual adjustor 12A2 and the auto-adjustor 12A3 for adjusting the amount of the air blown into the separator body 11, the other arrangement is possible.

For instance, a gas feeder that is capable of feeding nitrogen gas may be connected to the manual adjustor 12A2 and the auto-adjustor 12A3 to control a flow amount of the nitrogen gas. Alternatively, inactive gas such as argon or mixture gas of nitrogen gas and air may be fed instead of nitrogen gas.

With such an arrangement, kindling of the catalyst can be avoided with the use of inactive gas such as nitrogen gas.

Though the observation window 13 for allowing visual inspection of the inside of the separator body 11 is provided on a lateral portion of the upper cylinder 11A, the other arrangement is possible. For instance, the observation window 13 may be arranged to be openable/closable, where air flows into the inside of the separator body 11 by opening the observation window 13.

In this case, since the air flowed through the observation window 13 forms air-flow layer along the inner wall of the separator body 11, the collision of the catalyst against the inner wall can be further mitigated, thereby further restraining the damages on the catalyst.

Though the nozzle 12D is opposed to the opening at an end of the vertical section 14B, the other arrangement is possible. For instance, the nozzle 12D may be horizontally displaced relative to the vertical section 14B. In other words, the nozzle 12D may be provided in an off-center manner.

Though the blower unit 12 includes the air regulator 12A in a form of an air-amount controller for adjusting the amount of blown air in the above embodiment, it is not limitative. For instance, a constant amount of air may be introduced to the blower unit 12. Further the air regulator 12A may not be provided but air may be sucked by the suction power of the vacuum car 5.

Though the nozzle 12D is tapered to be wider toward the lower cone 11B in the above embodiment, it is not limitative. For instance, the nozzle 12D may be tapered to be narrower toward the lower cone 11B or may have a constant opening width.

Though the dumping hose 40 is provided between the separator 10 and the flexible container bag 30 in the embodiment, it is not limitative. For instance, the dumping hose 40 may not be provided but only the hopper 41 may be provided, where the flexible container bag 30 may be provided below the discharging portion of the hopper 41. Further alternatively, the hopper 41 may not be provided but the flexible container bag 30 may be provided vertically below the separator 10.

Though the catalyst inside the reactor 2 is sucked by the vacuum hose 5A in the embodiment, when it is expected that the catalyst is agglomerated, the operator may crush the agglomerated catalyst with a scoop, a pick, a breaker and the like and the crushed catalyst may be sucked by the vacuum hose 5A.

Specific arrangement and procedures for implementing the invention may be altered as long as an object of the invention can be achieved.

The entire disclosure of Japanese Patent Application No. 2008-042783, filed Feb. 25, 2008 is expressly incorporated by reference herein.

What is claimed is:

1. A separator that is in communication with a reactor loaded with a catalyst through a first connection hose and in communication with a vacuum unit through a second connection hose, the separator separating the catalyst sucked by the vacuum unit from the reactor from air, the separator comprising:
    a separator body that stores the catalyst; and
    a blower unit provided to the separator body for blowing a gas toward a bottom of the separator body to the catalyst sucked by the vacuum unit through the first connection hose, the blower being tapered to be wider toward the bottom of the separator body.

2. The separator according to claim 1, wherein
the blower unit comprises: a blower for blowing the gas, the blower being provided above of the first connection hose opened to an inside of the separator body; and a gas amount regulator that regulates an amount of the gas blown by the blower.

3. The separator according to claim 1, wherein
an inlet tube having an end connected to the first connection hose and another end opened approximately at a center of the separator body.

4. The separator according to claim 1, wherein the gas is air.

5. An unloading device, comprising:
the separator according to claim 1; and
a container provided below the separator, the container having a storage hole through which the catalyst is to be stored, wherein
the separator includes: a catalyst outlet provided near the bottom of the separator body relative to a communication hole of the first connection hose opened to an inside of the separator body and a connector hole of the second connection hose opened to the inside of the separator body, the catalyst outlet allowing a drop of the catalyst; and a cover that openably closes the catalyst outlet, and
the container is provided below the cover to store the catalyst passing through the catalyst outlet when the cover is opened.

6. The unloading device according to claim 5, wherein
a dumping hose substantially longitudinally extending along a vertical direction is provided between the separator and the container,
an upper end of the dumping hose is located below the catalyst outlet and has a first opening larger than the catalyst outlet, and
a lower end of the dumping hose is located above the storage hole and has a second opening smaller than the catalyst outlet.

* * * * *